United States Patent
Shao et al.

(10) Patent No.: US 7,093,509 B2
(45) Date of Patent: Aug. 22, 2006

(54) SCANNING PROBE MICROSCOPY APPARATUS AND TECHNIQUES

(75) Inventors: Rui Shao, Upper Darby, PA (US); Sergei V. Kalinin, Philadelphia, PA (US); Dawn A. Bonnell, West Chester, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 11/084,543

(22) Filed: Mar. 18, 2005

(65) Prior Publication Data

US 2005/0262930 A1    Dec. 1, 2005

Related U.S. Application Data

(60) Provisional application No. 60/554,138, filed on Mar. 18, 2004.

(51) Int. Cl.
 *G01N 33/00* (2006.01)
(52) U.S. Cl. ............................................ 73/866; 73/105
(58) Field of Classification Search ................... 73/866
See application file for complete search history.

(56) References Cited

U.S. PATENT DOCUMENTS

| | | | | |
|---|---|---|---|---|
| 5,394,083 | A * | 2/1995 | Jiles ............................ | 324/223 |
| 6,498,502 | B1 * | 12/2002 | Edwards et al. ............. | 324/750 |
| 2003/0132376 | A1 * | 7/2003 | Bonnell et al. ........... | 250/252.1 |

OTHER PUBLICATIONS

Abdullah, K., et al., "Low frequency and low temperature behavior of ZnO-based varistor by ac impedance measurements," *J. Appl. Phys.*, 1991, 69(7), 4046-4052.

Arakawa, H., et al., "Spatially resolved measurements of the capacitance by scanning tunneling microscope combined with a capacitance bridge," *J. of Vac. Sci. Technol. B*, 2001, 19(4), 1150-1153.

Clarke, D.R., "Varistor ceramics," *J. Am. Ceram. Soc.*, 1999, 82(3), 485-502.

De Wolf, P., "Two-dimensional carrier profiling of InP structures using scanning spreading resistance microscopy," *Appl. Phys. Lett.*, 1998, 73(15), 2155-2157.

De Wolf, P., et al., "Lateral and vertical dopant profiling in semiconductors by atomic force microscopy using conducting tips," *J. of Vac. Sci. Technol. A*, 1995, 13(3), 1699-1704.

Durkan, C., et al., "Investigations into local ferroelectric properties by atomic force microscopy," *Ultramicroscopy*, 2000, 82, 141-148.

Eng, L.M., et al., "Nanoscale reconstruction of surface crystallography from three-dimensional polarization distribution in ferroelectric barium-titanate ceramics," *Appl. Phys. Lett.*, 1999, 74(2), 233-235.

Eyben, M., et al., "Scanning spreading resistance microscopy and spectroscopy for routine and quantitative two-dimensional carrier profiling," *J. of Vac. Sci. Technol. B*, 2002, 20(1), 471-478.

(Continued)

*Primary Examiner*—Robert Raevis
(74) *Attorney, Agent, or Firm*—Woodcock Washburn LLP

(57) ABSTRACT

Scanning probe techniques based on the measurement of impedance spectroscopy using a conductive an SPM tip is provided and applied to the study of local transport properties, especially at a grain boundary. The contributions of the grain boundaries and tip-surface interaction can be distinguished based on the analysis of the equivalent circuit. The technique is applicable for both the spatially resolved study of transport mechanisms of polycrystalline semiconductors and the tip-surface contact quality. A piezoresponse force microscopy technique yields quantitative information about local non-linear dielectric properties and higher order electromechanical coupled of ferroelectrics.

9 Claims, 12 Drawing Sheets

OTHER PUBLICATIONS

Furukawa, T., et al., "Electrostriction as the origin of piezoelectricity in ferroelectric polymers," *Jpn. J. Appl. Phys.*, 1990, 29(4), 675-680.

Gruverman, A., et al., "Domain structure and polarization reversal in ferroelectrics studied by atomic force microscopy," *J. Vac. Sci. & Technol. B*, 1995, 13(3), 1095-1099.

Gupta, T.K., "Microstructural engineering through donor and acceptor doping in the grain and grain boundary of a polycrystalline semiconducting ceramic," *J. of Mater. Res.*, 1992, 7(12), 3280-3295.

Guy, I.L., et al., "Piezoelectricity and electrostriction in ferroelectric polymers," *Ferroelectrics*, 2001, 264, 33-38.

Hench, L.L., et al., "Ionic and defect conductors," *Principles of Electronic Ceramics*, Hench, L.L. (Eds.), *John Wiley & Sons Inc.*, 1990, Chap. 4, p. 136-184.

Hong, B.-S., et al., "Equilibrium electrical property measurements in electroceramics," *Key Eng. Mater.*, 1997, 125-126, 163-186.

Jiang, S.P., et al., "Electrochemical techniques in studies of solid ionic conductors," *Key Eng. Mater.*, 1997, 125-126, 81-132.

Kalinin, S.V., et al., "Imaging mechanism of piezoresponse force microscopy of ferroelectric surfaces," *Phys. Rev. B*, 2002, 65, 125408-1-1245408-11.

Kalinin, S.V., et al., Electrostatic and Magnetic Force Microscopy, *Wiley VCH, NY*, 2000, Chapter 7, 205-251.

McDonald, J., "Introduction to the LEVM complex nonlinear least squares fitting program," *LEVM Manual*, 1999, Issue 8.0, Section 1, 1-25.

Newnham, V., et al., "Electrstriction: nonlinear electromechanical coupling in solid dielectrics," J. Phys. Chem. B, 1997, 101, 10141-10150.

Raistrick, I.D., et al., "The electrical analogs of physical and chemical processes," *Physical and Electrochemical Models*, 1987, *Chapter 2*, 27-131.

Rosner, B.T., et al., "Microfabricated silicon coaxial field sensors for near-field scanning optical and microwave microscopy," *Sensors & Actuators A*, 2002, 185-194.

Strukov, B.A., et al., *Ferroelectric Phenomena in Crystals: Physical Foundations*, Strukov, B.A., et al. (Eds.), *Sprnger-Verlag Heidelberg*, 1998, Chap. 5, 110-115.

Sze, S.M., "Metal-semiconductor devices," *Physics of Semiconductor Devices, Wiley-Interscience*, 1981, 363-421.

Tran, T., et al., "Zeptofarad" ($10^{-21}$F) resolution capacitance sensor for scanning capacitance microscopy, *Rev. Sci. Instrum.*, 2001, 72(6), 2618-2623.

Zhang, Q.M., et al., "Laser interferometer for the study of piezoelectric and electrostrictive strains," *J. Appl. Phys.*, 1988, 63(8), 2492-2496.

* cited by examiner

Figure 8a  Figure 8c  Figure 8e
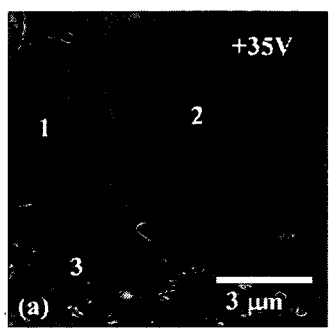
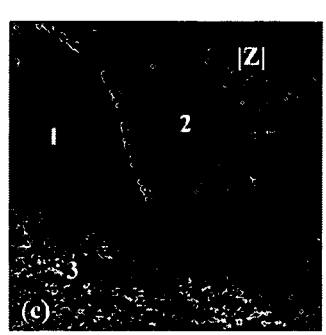
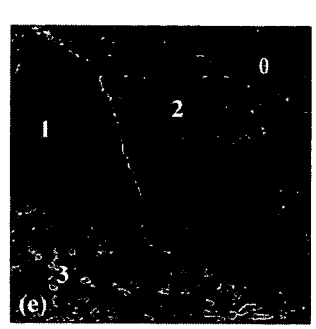
0nm ▬▬▬ 60nm   14MΩ ▬▬▬ 19MΩ   -90° ▬▬▬ -20°
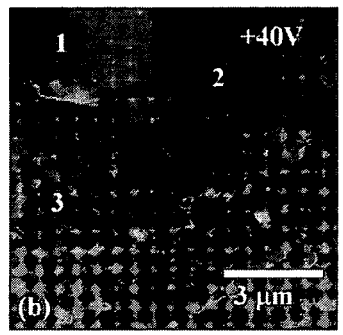
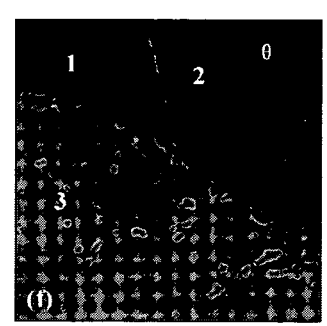
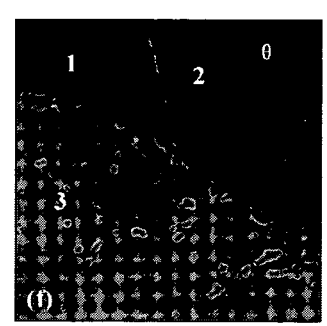
0nm ▬▬▬ 60nm   6.1MΩ ▬▬▬ 18MΩ   -90° ▬▬▬ -10°
Figure 8b  Figure 8d  Figure 8f

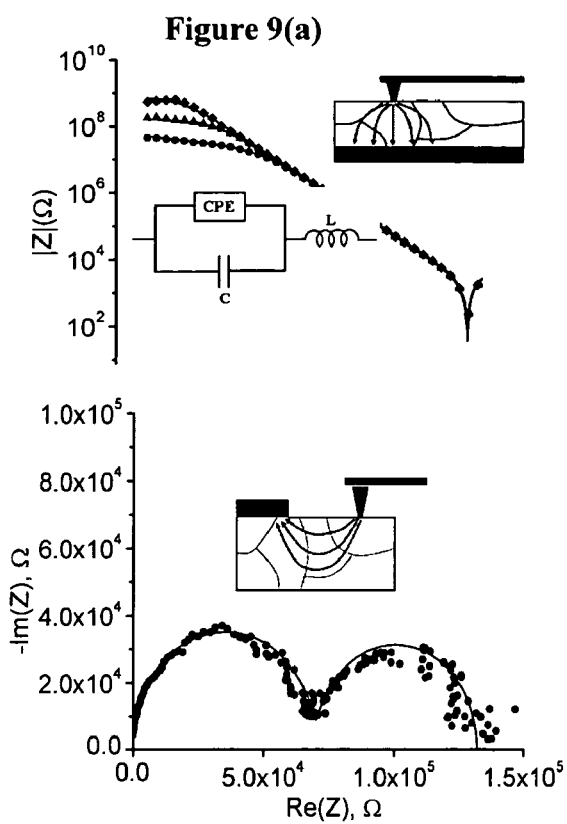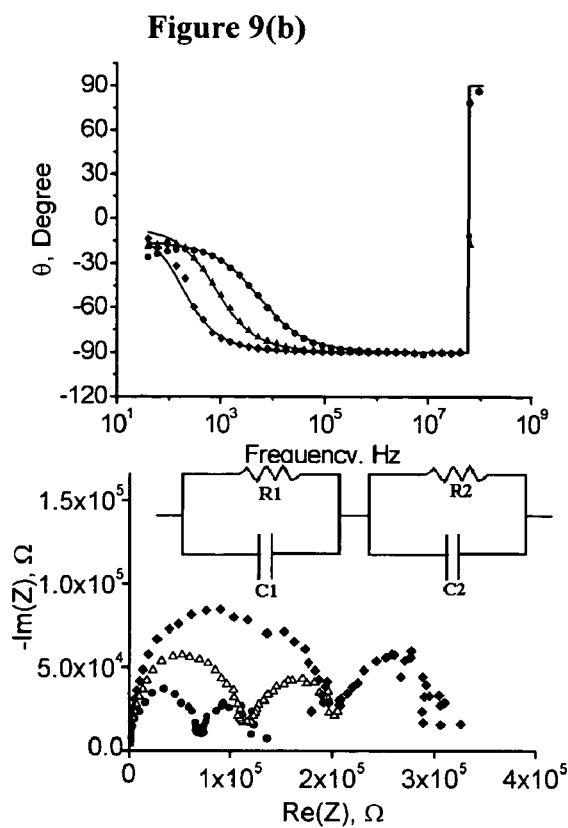
Figure 9(a)
Figure 9(b)
Figure 9(c)
Figure 9(d)

SCANNING PROBE MICROSCOPY APPARATUS AND TECHNIQUES

This application claims the benefit of U.S. Provisional Application No. 60/554,138, which was filed on Mar. 18, 2004, which is incorporated herein by reference in its entirety.

BACKGROUND

The present invention(s) relate to measurement apparatus and methods, and more particularly to scanning probe microscopy apparatus and methods.

The fundamental understanding of nanoscale phenomena as well as its exploitation in device applications requires access to local properties. In recent years, a number of scanning probe based techniques, including scanning surface potential microscopy (SSPM), scanning spreading resistance microscopy (SSRM), and scanning capacitance microscopy (SCM), have been developed to access microscopic transport properties of nanoscale structures. (See S. V. Kalinin and D. A. Bonnell, in *Scanning Probe Microscopy and Spectroscopy: Theory, Techniques and Applications*, ed. D. A. Bonnell (Wiley VCH, New York, 2000, p. 205)). As processing of nanostructures becomes more sophisticated, there may be the potential to utilize complex materials such as nonlinear electronic, ferro and piezo electric, and ferromagnetic compounds.

In many complex materials multiple physical parameters are strongly coupled so that the complexity often takes on the form of nonlinear response to external excitations. For example, polycrystalline oxides and semiconductors exhibit non linear electrical behavior and capacitive coupling that are exploited in positive temperature coefficient of resistance, thermistors and varistors, and in solar cells. Nonlinear electro-mechanical properties in organic and inorganic ferroelectrics are used in memory devices and passive circuitry.

The incorporation of these and other materials at nanoscale dimensions has motivated the development of scanning probe microscopy (SPM) techniques and like techniques that access nonlinear properties. Conventional SPM techniques may be used for imaging and measuring various local properties of surfaces or materials on a small scale. SPM techniques typically work by measuring a local property—including mechanical properties such as height, electrical properties such as capacitance or impedance, magnetic properties, electrostriction, piezoelectric effect, or ferroelectric effect—with a probe tip placed very close to the sample. Often, the microscope raster-scans a probe over the sample while measuring the particular local property.

For example, in atomic force microscopy (AFM), a small tip on the end of a cantilever is moved across a surface. A vertical deflection of the cantilever by repulsive forces (in contact mode) indicates local height.

Also, piezoresponse force microscopy (PFM) is an SPM technique in which periodic bias is applied to a conductive tip in contact with a surface. The bias results in periodic surface displacement due to inverse piezoelectric effect or electrostriction of a ferroelectric surface. Mapping of the amplitude and phase of the displacement provides information of ferroelectric domain structures.

Various SPM tips having a conductive coating are commercially available from various suppliers. For any SPM mode, in which the tip is in contact with the surface, a conductive coating can be degraded due to mechanical wear or high current density in the tip-surface junction. (See P. Eyben, M. Xu, N. Duhayon, T. Clarysse, S. Callewaert, W. Vandervorst, *J. Vac. Sci. Technol.* B 20, 471 (2002))

SUMMARY

Nonlinear materials have found wide applications in electronic devices. Of special importance and interest are those with varistor-type grain boundaries and those displaying large piezoelectric and electrostrictive responses to external fields. To access the local properties of these materials, the present disclosure provides two new contact mode scanning probe techniques. The first technique, referred to herein as nanoimpedance microscopy/spectroscopy (NIM), incorporates impedance spectroscopy with a conducting AFM tip as an electrode. NIM is demonstrated by measuring local grain boundary properties of a ZnO varistor, as well as the contact quality between an AFM tip and a ferroelectric sample. The other technique, referred to herein as second or higher harmonic piezoresponse force microscopy (HH-PFM), is capable of measuring electrical, electro-mechanical, or other properties. HH-PFM, for illustration, is applied to the analysis of electrostriction and demonstrated on ferroelectric polymer thin film. A theoretical model is presented to describe the contrast formation of the second harmonic as well as the first harmonic (piezoresponse) images and to explain the observed hysteretic field dependence of the second harmonic amplitude signal.

Regarding NIM, a scanning probe technique based on the impedance spectroscopy with a conductive AFM tip is provided to investigate local frequency dependent properties. Since the electric field is concentrated at the tip-surface junction, the local contribution is significant, rendering submicron resolution possible. (See P. De Wolf, J. Snauwaert, L. Hellenmans, T. Clarysse, W. Vandervorst, M. D'Olieslaeger, and D. Quaeyhaegens, J. Vac. Sci. Technol. A 13, 1699 (1995); P. De Wolf, M. Geva, T. Hantschel, W. Vandervorst, and R. B. Bylsma, Appl. Phys. Lett. 73, 2155 (1998); and Hitoshi Arakawa and Ryusuke Nishitani, J. Vac. Sci. Technol. B 19, 1150 (2001))

An additional contribution to the impedance arises from the larger scale microstructural elements such as grain boundaries and remote electrical contacts. From the analysis of impedance data, relaxation processes at the tip-surface junction, grain boundaries and electrodes can be differentiated according to characteristic time constants. (See S. P. Jiang, J. G Love, and S. P. S. Badwal, Key Eng. Mater. 125–126, 81 (1997); J. R. Macdonald and W. B. Johnson, *Impedance Spectroscopy: Emphasizing Solid Materials and Systems*, ed. J. R. Macdonald (John Wiley & Sons Inc., 1987). Combination of this analysis with spatially resolved impedance imaging yields frequency, bias and position dependent information on microscopic transport properties.

Regarding HH-PFM, by combining contact and non-contact, phase and amplitude detection, and feedback of not only 1st harmonic tip/surface response functions, but also 2nd and 3rd harmonic response functions, a wide range of properties can be accessed. Examples include piezoelectric force microscopy (PFM), scanning capacitance microscopy, near field microwave microscopy, and nonlinear dielectric microscopy. An underlying theme of the newest developments is the use of multiple signal modulations or high order harmonics of modulated signals. NIM and HH-PFM address two of the most useful nonlinear properties in electronic materials, namely grain boundary and defect mediated transport and electrostriction in ferroelectrics.

Regarding NIM, a method of assessing properties of a sample's grain boundaries is provided. The method comprises the steps of (a) providing a scanning force microscope probe having a conductive probe tip on a cantilever, (b) disposing the tip on a point on a surface of the sample, (c) applying a modulated voltage to the probe tip; and (d) providing an electrode in contact with the sample to enable acquiring of impedance modulus and phase, whereby information relating to grain boundaries may be obtained.

The information preferably includes electrical information about the transport properties across the grain boundaries. Preferably, an atomic force microscope is employed in order to make ascertain topography of the sample.

Regarding HH-SPM, a method for determining non-linear properties of a sample is provided. The method comprises the steps of (a) providing the sample having a surface; (b) providing a scanning probe microscope having a conductive probe tip; (c) contacting the sample's surface with the probe tip; (d) applying a modulated voltage to the tip-surface junction and measuring a signal corresponding to electrostriction; and (e) acquiring the second order harmonic function of the electrostriction signal, whereby spatially localized characterization of the non-linear properties is enabled. Preferably, an atomic force microscope is employed such that electrostriction in response to the applied voltage is measured by deflection of the cantilever.

Also, a method of assessing the quality or sufficiency of the conductive coating of SPM tip and surface is provided. The method comprises the steps of a) providing the probe tip; b) contacting a surface with the probe tip; c) applying a time dependent voltage across the tip-surface junction; and d) acquiring impedance of at least the tip-surface junction, whereby sufficiency of the conductive coating can be ascertained by the impedance characteristics. Preferably, an atomic force microscope is employed.

BRIEF DESCRIPTION OF THE FIGURES

FIG. 8(a) is an image of surface topography of three ZnO grains acquired at a bias of $V_{dc}$=+35V;

FIG. 8(b) is an image of the surface topography of the grains shown in FIG. 8(a) but at a bias of $V_{ac}$=0.1V and f=10 kHz;

FIG. 8(c) is an image of impedance amplitude log|Z| for the conditions of FIG. 8(a);

FIG. 8(d) is an image of impedance amplitude log|Z| for the conditions of FIG. 8(b);

FIG. 8(e) is an image of phase angle θ for the conditions of FIG. 8(a);

FIG. 8(f) is an image of phase angle θ for the conditions of FIG. 8(b);

FIG. 9(a) is a plot of impedance amplitude of a ZnO varistor acquired under different tip/sample biases;

FIG. 9(b) is a plot of impedance phase angle of the ZnO varistor of FIG. 9(a) acquired under different tip/sample biases;

FIG. 9(c) is the fitting of impedance data at bias=+5V to the equivalent circuit of two RC elements in series; and FIG. 9(d) is a Cole-Cole plot of impedance spectra acquired with a top electrode configuration at different tip/sample biases.

DETAILED DESCRIPTION OF PREFERRED EMBODIMENTS

Figure 1A:
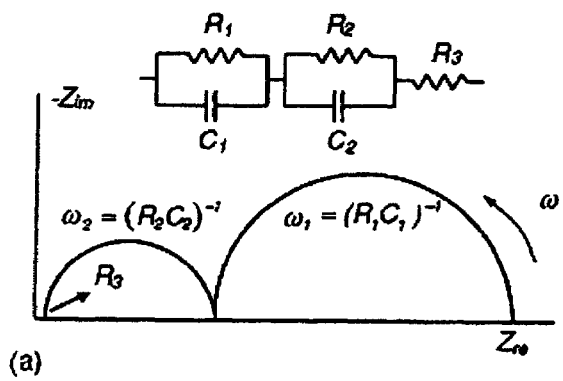
FIG. 1(a) is a resistor and capacitor model of a polycrystal, with interfaces and probe contacts modeled as parallel R-C elements.
Figure 1C:
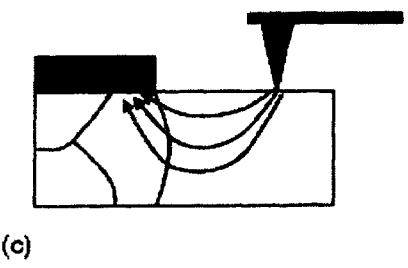
FIG. 1(c) is an enlarged, schematic view of the probe/electrode configuration illustrating a second embodiment of the apparatus otherwise shown in FIG. 1(b)
Figure 1D:
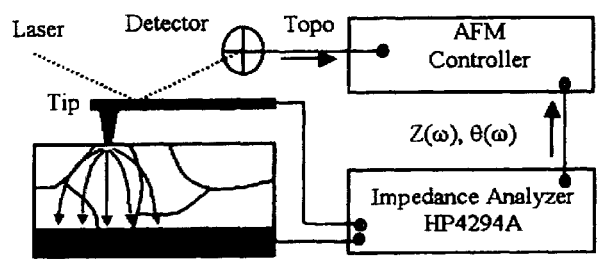
FIG. 1(d) is a schematic view of an apparatus similar to that shown in FIG. 1(b)
Figure 1E:
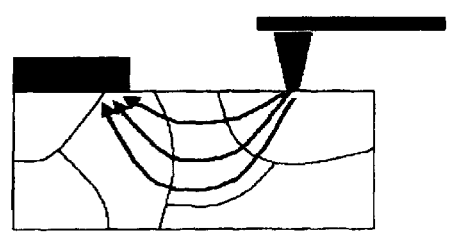
FIG. 1(e) is an enlarged, schematic view of the probe/electrode configuration illustrating a second embodiment of the apparatus otherwise shown in FIG. 1(e)
Figure 1B:
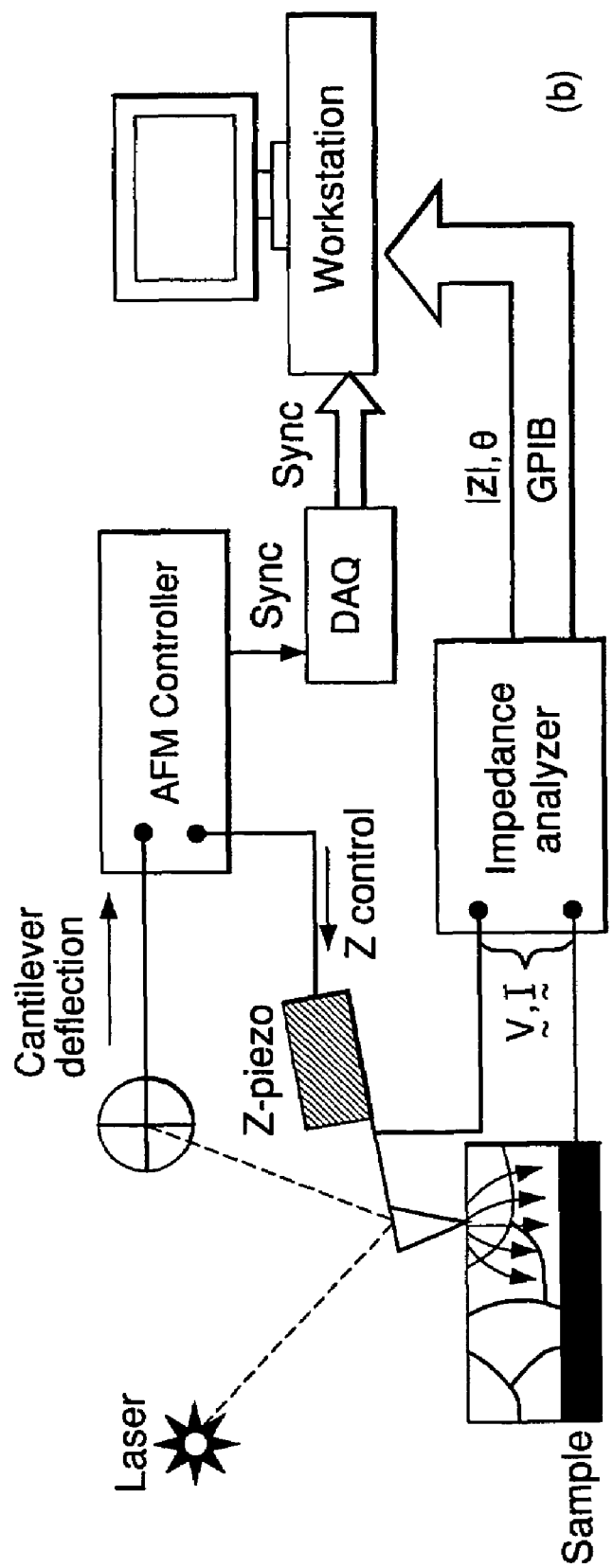
FIG. 1(b) is a schematic view of an apparatus illustrating a first technique.

A first technique provided herein is a Nanoimpedance Microscopy/Spectroscopy technique, which incorporates impedance spectroscopy with a conducting AFM tip as an electrode.

Nonlinear electrical behavior can be induced in polycrystalline semiconductor or oxide or diode junctions because resistive grains are separated by interfaces that contain potential barriers. (See L. L. Hench and J. K. West: *Principles of Electronic Ceramics*, eds. L. L. Hench and J. K. West (John Wiley & Sons Inc., 1990) Chap. 4., p. 136; T. K. Gupta: *J. Mater. Res.* 7 (1992) 3280)). The overall response depends on the properties, size and configurations of the components. In prior-art macroscopic systems the average properties are determined from the frequency dependence of conductance or impedance, i.e. impedance spectroscopy, which can differentiate relaxation processes according to their time constants. (See J. R. Macdonald and W. B. Johnson: *Impedance Spectroscopy: Emphasizing Solid Materials and Systems*, ed. J. R. Macdonald (John Wiley & Sons Inc., 1987) Chap. 2, p. 27.; B.-S. Hong, S. J. Ford and T. O. Mason: *Key Eng. Mater.* 125–126(1997) 163.) Some attempts in the prior art have been made to translate these impedance spectroscopy techniques to the micron level to assess and quantify average electrical properties, but the inventors demonstrate herein that high spatial resolution characterization of grain boundaries can be achieved by acquiring impedance spectra using a conducting atomic force microscopy (AFM) tip as one mobile electrode.

Impedance, as is well known, is defined as the ratio of the ac voltage excitation (response) to the current response (excitation), i.e. $Z=Z(\omega)=V(\omega)/I(\omega)$. Impedance Z is usually expressed in complex form in terms of its modulus $|Z|$ and phase $\theta$ as $Z=|Z|e^{i\theta}$. Z is a function of frequency $\omega$ because processes such as dipole reorientation, ionic motion, and electron trapping, respond with different time constants. These processes are modeled with equivalent circuit elements: resistor R, capacitor C and inductor L, in serial or parallel connections. In polycrystals, interfaces and contacts are modeled as parallel R-C elements, and thus $$Z = \frac{1}{\frac{1}{R} + j\omega C},$$

which is a semicircle in the Cole-Cole plot (real component $Z_{re}$ vs imaginary component $-Z_{im}$). The time constant $\tau_o = \omega_o^{-1} = (RC)^{-1}$, where $\omega_0$ is the angular frequency ($\omega=2\pi f$) corresponding to the apex of the semicircle, as is well known.

The equivalent circuit of a two probe measurement of grain boundaries is shown in FIG. 1(*a*). Two R-C elements ($R_1$, $C_1$) and ($R_2$, $C_2$) model the contact, and grain boundary impedances, respectively. Conducting grains have very small capacitance and are modeled as a resistor ($R_3$). The various contributions are distinguished by nonlinear fitting of the experimental Cole-Cole plots, which are shown in FIG. 3(*a*) and FIG. 9(*d*).

In the impedance spectrum of a tip/sample in contact, the contribution from the capacitance of this junction is extremely small (~aF) (See T. Tran, D. R. Oliver, D. J. Thomson and G. E. Bridges: *Rev. Sci. Instrum.* 72 (2001) 2618.) while that from junction resistance and stray capacitance can be significant. For a good contact, the junction resistance is determined by tip radius a and local resistivity $\rho$ as $R=\rho/4a$. (See P. De Wolf P, J. Snauwaert, L. Hellemans, T. Clarysse, W. Vandervorst, M. D'Olieslaeger and D. Quaeyhaegens: *J. Vac. Sci. & Technol.* A 13 (1995) 1699.) This implies that for a conducting sample (small $\rho$), contributions from larger structures such as grain boundaries will dominate.

NIM Experimental Procedures

In a first test, NIM was implemented on a commercial microscope (DI Dimension 3000 NS IIIA) using gold-coated tips (NCSC 12 Cr—Au, Micromasch). Sample and tip holders have been designed such that the tip acts as one terminal probe of an impedance analyzer (HP4294A). A shielded cable is used to reduce the phase error in the high frequency range. The second electrode is either a bottom electrode (single-terminal configuration), or a micro-patterned top electrode (two-terminal configuration) as illustrated in FIG. 1(*d*) and FIG. 1(*e*), respectively. Impedance modulus, log$|Z|$, and phase angle, $\theta$, images are collected, where the measured impedance, $Z(\omega)$ is defined as the ratio of the probing voltage, $V(\omega)$, to the measured current, $I(\omega)$, as $Z(\omega)=V(\omega)/I(\omega)=|Z|\exp(i\theta)$.

NIM was implemented in both imaging and spectroscopic modes. In the imaging mode, the tip acquires the surface topography in AFM contact mode. A constant dc bias, $V_{dc}$, and a probing ac bias, $V_{ac}$, at frequency, f, are applied between the tip and the counter electrode. The impedance at different tip locations is collected to form amplitude, log$|Z|$, and phase angle, $\theta$, images. In the spectroscopic mode, the tip position is fixed and local impedance-frequency or impedance-dc bias spectra are acquired.

In a second test, NIM was implemented on a commercial ambient AFM (Digital Dimension 3100). A conducting tip coated with a layer of Cr/Au was electrically isolated from the AFM feedback electronics and connected to an impedance analyzer (Agilent HP4294 A). The analyzer applies a voltage modulation in frequency range of 40 to $1.1\times10^8$ Hz with amplitudes from 0.005 to $1V_{rms}$ to the tip and the second electrode is also connected to the analyzer input. The AFM scans in contact mode with force feedback, while Z and $\theta$ at each point are collected by a computer program via a digital data connection to the impedance analyzer in synchronization with the scan trace. To acquire a local impedance spectrum the tip is held in one position while the frequency is varied. Again, the counter-electrode can be either a micro contact patterned on the surface (two terminal configuration) or a conducting substrate (one terminal configuration) as shown in FIG. 1(*b*) and FIG. 1(*c*), respectively.

The technique is used to characterize interfaces in a polished polycrystalline zinc oxide varistor. These devices typically consist of doped ZnO grains of 10 to 70 microns, with Bi rich secondary phases, such as pyrochlore and amorphous grain boundary films. A round sample of 1.8 cm in diameter was soldered onto a copper plate with indium for one-terminal measurements. Small indium contacts with 150 mm in diameter were evaporated with a shadow mask on the surface of the varistor for two terminal measurements. The microcontact selected as the counter electrode was wire-bonded.

NIM Results and Discussion

NIM was demonstrated on a grain boundary limited transport in a sectioned commercial polycrystalline ZnO varistor. Prior to and between the measurements, the tip coating was tested using the method described below and referred to herein as the second technique. The bottom electrode configuration was employed. Impedance images, shown in FIG. 8, of the junction of three ZnO grains were acquired at tip-sample dc biases of $V_{dc}$=+35 V and +40 V with probing ac bias $V_{ac}$=50 mV at 10 kHz. Note that the phase angle is −90° on grain 1, indicating that the transport in this region is purely capacitive. The measured impedances in the regions of grains 2 and 3 decrease with tip bias, indicative of the varistor behavior. (See D. R. Clarke, *J. Am. Ceram. Soc.* 82, 485 (1999)).

FIG. 9 shows (a) amplitude and (b) phase of the impedance of a ZnO varistor acquired under different tip/sample biases: +40V(●), +30V(▲), +20V(♦) with the bottom electrode configuration and the fitting to the equivalent circuit (−); (c) the fitting of impedance data at bias=+5V(●) to the equivalent circuit of two RC elements in series (−); (d) Cole-Cole plot of impedance spectra acquired with a top electrode configuration at different tip/sample biases: +5V (●), +3V(Δ), +2V(♦).

Impedance spectra exhibit enhanced conductivity at high biases as illustrated in FIG. 9(*a*) and FIG. 9(*b*). In the frequency range of 40 Hz to 30 MHz, the electrical properties of polycrystalline ZnO are dominated by the resistive grain boundary effect. The best fits for the experimental impedance spectra were achieved using parallel capacitor-constant phase element (CPE, $Z_{CPE}=A^{-1}(i\omega)^{-\alpha}$, where $-1 \leq \alpha \leq 1$ and A in $1/\Omega$) model, $Z=1/(i\omega C+A(i\omega)^{\alpha})$ in series with cable inductance, L. Parameters of the circuit elements at different biases were obtained by a multivariable fitting procedure—Complex Nonlinear Fitting. (See J. R. Macdonald, *CNLS Immittance Fitting Program LEVM Manual* v7.11, J. R. Macdonald and Solartron Group Ltd. 1999) From the depressed impedance semicircle in the Cole-Cole plots (not shown), the grain boundary resistance, $R_{gb}$, is determined to be on the order of $10^7$ to $10^8$ and decreases with increased bias (Table I). From comparison of the breakdown voltage for the individual grain boundary (~3 V) and breakdown voltage in these measurements (~30 V) we conclude that all grain boundaries between the tip and the bottom electrode are probed simultaneously. This accounts for the time constant dispersion in a system consistent with the observed CPE behavior. The characteristic capacitance, C, is on the order of 1pF, which is best construed as the tip/surface stray capacitance which dominates over characteristic tip-surface junction capacitance(~aF). (See K. Al Abdullah, A. Bui, and A. Loubiere, *J. Appl. Phys.* 69, 4046 (1991); T. Tran, D. R. Oliver, D. J. Thomson, and G. E. Bridges, *Rev. Sci. Instrum.* 72, 2618 (2001))

TABLE I

Equivalent circuit parameters in single terminal measurements

| Bias, V | α | A, $\Omega^{-1}$ | C, F | $R_{gb}$, $\Omega$ | L, H |
|---|---|---|---|---|---|
| 20 | $3.0 \times 10^{-2}$ | $1.16 \times 10^{-9}$ | $1.30 \times 10^{-12}$ | $7.13 \times 10^{8}$ | $5.69 \times 10^{-6}$ |
| 25 | $4.3 \times 10^{-2}$ | $1.95 \times 10^{-9}$ | $1.36 \times 10^{-12}$ | $3.89 \times 10^{8}$ | $5.39 \times 10^{-6}$ |
| 30 | $6.8 \times 10^{-2}$ | $4.07 \times 10^{-9}$ | $1.42 \times 10^{-12}$ | $1.62 \times 10^{8}$ | $5.70 \times 10^{-6}$ |
| 35 | $1.17 \times 10^{-1}$ | $4.94 \times 10^{-9}$ | $1.44 \times 10^{-12}$ | $8.92 \times 10^{7}$ | $5.11 \times 10^{-6}$ |
| 40 | $1.73 \times 10^{-1}$ | $7.32 \times 10^{-9}$ | $1.32 \times 10^{-12}$ | $3.8 \times 10^{7}$ | $5.57 \times 10^{-6}$ |

To study transport behavior in the vicinity of a single grain boundary, the top electrode configuration with an Ohmic micro-contact was adopted. From the Cole-Cole plot, two major relaxation processes occur within frequency range from 40 Hz to 110 MHz. as shown in FIG. 9(c) and FIG. 9(d). In this case, a parallel R-C model associated with transport in the grain boundary and the Schottky contact of tip-coating and surface provides the best description of the impedance data. From FIG. 9(c) and FIG. 9(d), both the grain boundary resistance and the tip-surface resistance can be estimated to be on the order of 100 k$\Omega$, as shown is Table II.

TABLE II

Equivalent circuit parameters in two-terminal measurements

| Bias, V | $R_1$, $\Omega$ | $C_1$, F | $R_2$, $\Omega$ | $C_2$, F |
|---|---|---|---|---|
| 2.0 | $1.94 \times 10^{5}$ | $0.34 \times 10^{-12}$ | $1.25 \times 10^{5}$ | $7.2 \times 10^{-11}$ |
| 3.0 | $1.17 \times 10^{5}$ | $0.32 \times 10^{-12}$ | $9.30 \times 10^{4}$ | $7.4 \times 10^{-11}$ |
| 5.0 | $7.20 \times 10^{4}$ | $0.33 \times 10^{-12}$ | $7.70 \times 10^{4}$ | $1.1 \times 10^{-10}$ |

Figure 2A:
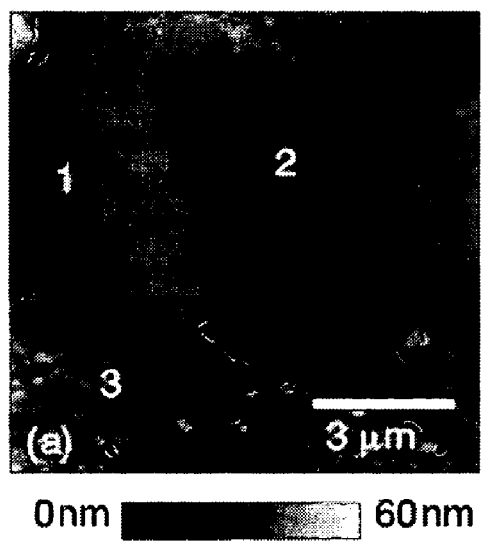
FIG. 2(a) is a topography image a junction of grains on the surface of a ZnO varistor.
Figure 2B:
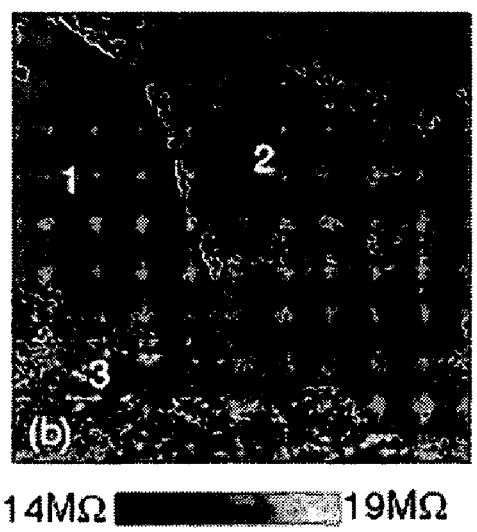
FIG. 2(b) is an image of impedance amplitude of same ZnO varistor shown in FIG. 2(a) measured at 10 kHz with one terminal configuration.
Figure 2C:
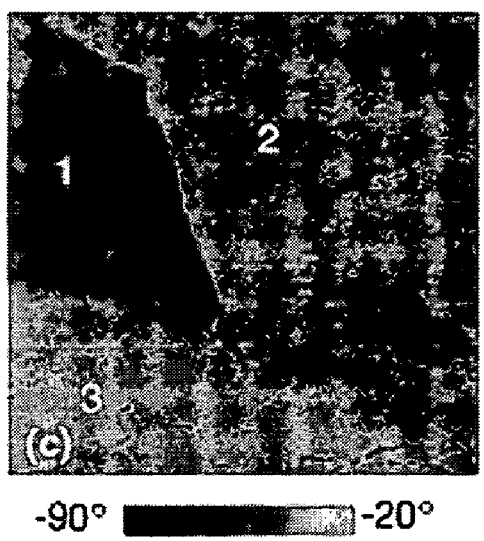
FIG. 2(c) is an image of the impedance phase shift of the same ZnO varistor shown in FIG. 2(a) measured at 10 kHz with one terminal configuration.

Under a dc bias of +35V between the tip and sample, ZnO grains were imaged at frequency f=10 kHz. The results are shown in FIG. 2(a), FIG. 2(b), and FIG. 2(c). Three regions can be identified in topography, |Z|, and θ images. In region 1, transport is highly limited resulting in high |Z| and θ is close to −90 degrees indicating an almost purely capacitive tip/sample coupling. Indeed, this region is the bismuth-rich phase at the junction of three large ZnO grains. The bismuth-rich phase is known to form a resistive barrier, consistent with FIG. 2(b). Region 2 and 3 are adjacent grains with different resistances, as can be distinguished in the contrast of the |Z|, and images.

Figure 3A:
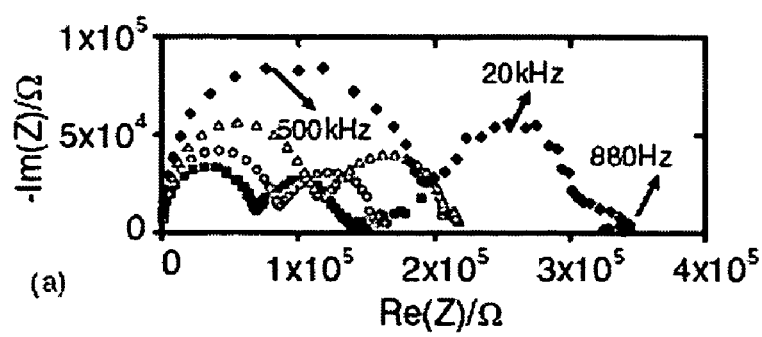
FIG. 3(a) is a Cole-Cole plot of the impedance across one grain boundary measured with two terminal configuration. Tip/sample dc biases are +2 V(♦), +3 V(Δ), +4 V(○) and +5 V(■).
Figure 3B:
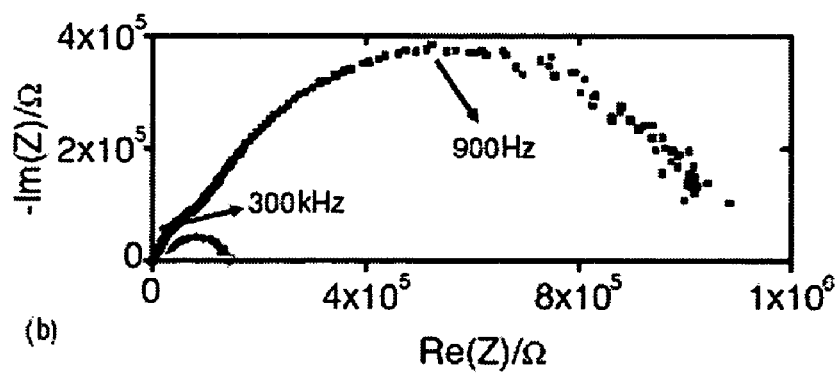
FIG. 3(b) is a plot of impedance measured across two microcontacts showing two relaxation processes under dc biases 25 V(■) and 30V(♦).
Figure 4A:
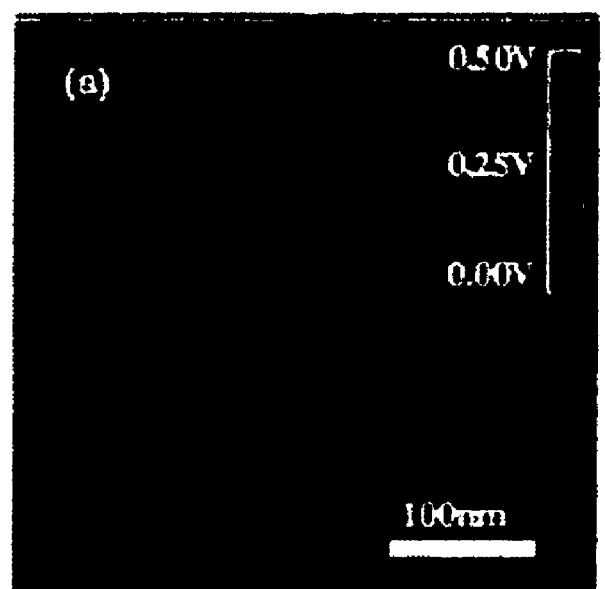
FIG. 4(a) is a piezoresponse image of the barium titanate thin film imaged with a tip with good electrical coating. Ferroelectric domains in the thin film are clearly visible from the contrast.
Figure 4B:
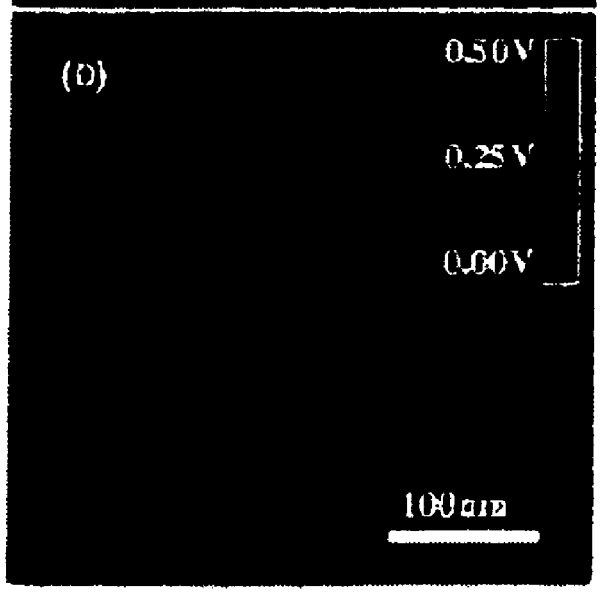
FIG. 4(b) a piezoresponse image of the barium titanate thin film imaged with a tip with broken (bad) electrical coating. Ferroelectric domains in the thin film are not resolvable.
Figure 4C:
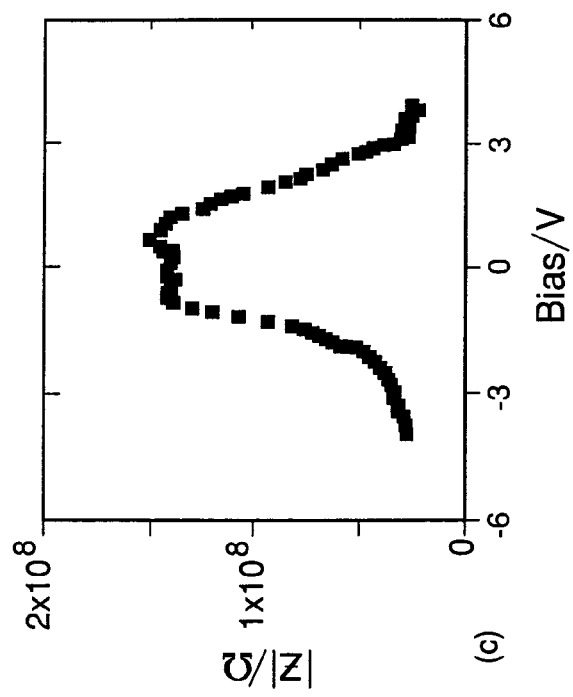
FIG. 4(c) is a bias dependent impedance curve measured at 10 kHz relating to FIG. 4(a)
Figure 4D:
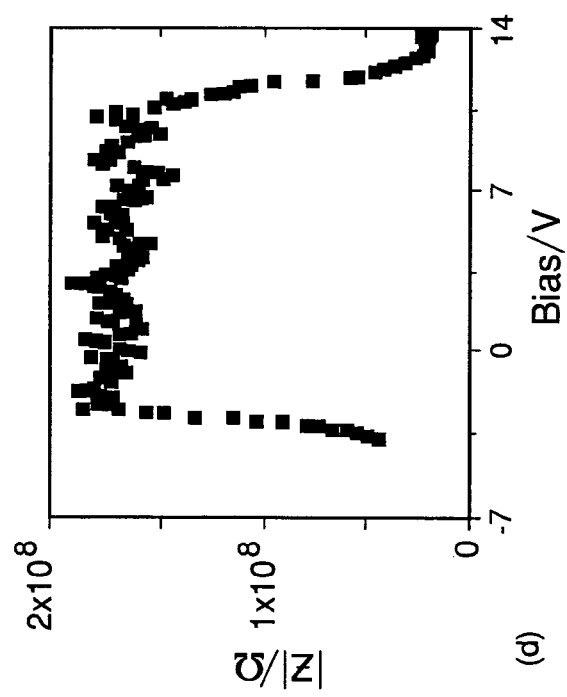
FIG. 4(d) is a bias dependent impedance curve measured at 10 kHz relating to FIG. 4(b)
Figure 4E:
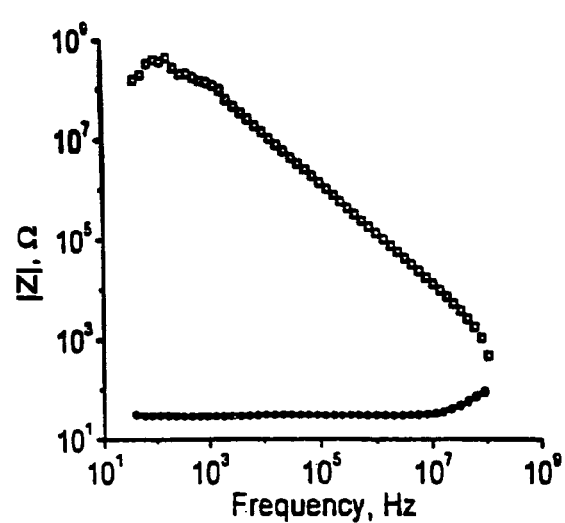
FIG. 4(e) is a plot of amplitude, |Z|, spectra in the frequency range from 40 Hz to 110 MHz of a tip/Au surface contact for undamaged (●) and damaged (□) tip.
Figure 4F:
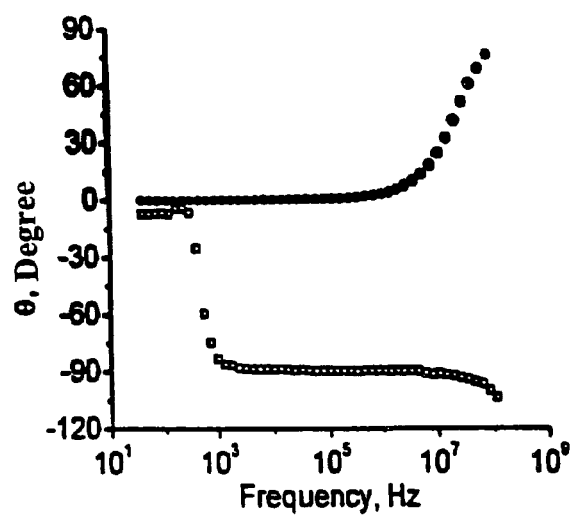
FIG. 4(f) is a plot of phase angle, θ, spectra in the frequency range from 40 Hz to 110 MHz of a tip/Au surface contact for undamaged (●) and damaged (□) tip.

Here the inventors note that NIM differs from scanning spreading resistance microscopy, in that the latter collects the spreading resistance at the tip/sample contact, in contrast to interface and grain properties quantified by NIM. Furthermore, NIM is capable of measuring capacitance as well as distinguishing the electrode/sample contact resistance from the grain boundary resistance. FIG. 3(a) shows NIM impedance spectra that characterize transport through a single ZnO grain boundary acquired in the 2-terminal configuration. Tip/sample dc biases are +2 V(◆), +3 V(△), +4 V(○) and +5 V(■). The spectra acquired across the grain boundary exhibit three relaxation processes, while macroscopic measurement between two microcontacts exhibits only two relaxation processes. In FIG. 3(a) the low frequency semicircle corresponds to the counter-electrode microcontact and the high frequency semicircle corresponds to the tip/sample junction. By comparing these frequencies to those in FIG. 3(b), which shows the impedance measured across two microcontacts shows two relaxation processes under dc biases 25 V(■) and 30V(◆), the three semicircles can be associated with counter-electrode contact, AFM tip and grain boundary. Grain boundary resistance is extracted by nonlinear curve fitting procedure and the varistor behavior (nonlinear I/V behavior) is evident from the decrease in the grain boundary resistance with increasing dc bias (Table III).

TABLE III

The dc bias dependence of resistance of the Grain Boundary, the tip/sample contact, and the counter-electrode.

| | GB | | Tip/sample junction | | Counter-electrode | |
|---|---|---|---|---|---|---|
| DC bias $V_{dc}$ (V) | $R_{gb}$ (k$\Omega$) | $C_{gb}$ (pF) | $R_{junction}$ (k$\Omega$) | $C_{junction}$ (pF) | $R_{counter}$ (k$\Omega$) | $C_{counter}$ (pF) |
| 2 V | 97.09 | 0.648 | 60.56 | 16.51 | 26.84 | 18.27 |
| 3 V | 58.53 | 0.541 | 46.87 | 15.97 | 8.302 | 141.4 |
| 4 V | 43.91 | 0.509 | 38.56 | 12.12 | 5.858 | 59.60 |
| 5 V | 36.18 | 0.433 | 34.64 | 11.44 | 5.848 | 74.67 |

NIM is not limited to the local characterization of grain boundary transport. Since the tip/sample contact contributes to the spectrum, the measurement can be used to characterize the contact, which is a second technique provided herein. This technique is illustrated in FIG. 4, which compares piezoresponse force microscopy (PFM) images acquired with a "good" tip and a "bad" tip with the voltage dependence of impedance. These data were obtained on a lightly reduced polycrystalline BaTiO$_3$ thin film grown on sapphire substrate. In PFM, a bad tip/sample contact significantly reduces the electromechanical signal leading to unreliable results. (See S. V. Kalinin and D. A. Bonnell: *Phys. Rev.* B 65 (2002) 125408.) In the image acquired with a new gold coated silicon tip (Mikromasch Inc., extra 110 nm Cr/Au deposited on the cantilever), the amplitude of the piezoresponse signal clearly shows features corresponding to several domains, as shown in FIG. 4(*a*), and the bias dependent tip/film contact impedance measured at 10 kHz exhibits small rectification, as shown in FIG. 4(*c*). After the tip coating degrades, the piezoresponse signal weakens, as shown in FIG. 4(*b*), and the degradation becomes obvious from larger rectification and higher resistance in the impedance data, as shown in FIG. 4(*d*).

For example, the tip coating quality can be determined by contacting the tip with an inert metal surface such as gold and acquiring an impedance spectrum as illustrated in FIGS. 4(*e*) and 4(*f*). For the data provided, the typical resistance of the tip-surface contact for an undamaged tip is less than 40 ohms. The phase angle is virtually zero over a broad frequency range (40 Hz to 30 MHz), indicative of resistive coupling; the tip-surface impedance is virtually bias independent (not shown). For a damaged tip, the resistance of the tip-surface contact is much higher (>100 MΩ) and the coupling becomes capacitive, as can be seen from the phase shift to −90° when frequency increases. In this case, the contact resistance exhibits a strong bias dependence characteristic for a Schottky metal-semiconductor contact. (See S. M. Sze, *Physics of Semiconductor Devices* (Wiley-Interscience, 1981, p. 363).

As implemented here, the major limitations in the spatial resolution and the sensitivity comes from the stray capacitance between the cantilever and the sample surface. This stray capacitance $C_S$ has set the limit of measurable tip/sample resistance R at a given frequency f to $R < 1/2\pi f C_S$. Specifically, for our experimental setup, with the lowest frequency f=40 Hz and $C_S \approx 10$ pF, R should be at least smaller than 398 MΩ. Although stray capacitance is nonlocal, it is also dc bias independent unlike GB capacitance; consequently it can be identified in variable dc bias impedance measurements. Further minimization of stray capacitance could be achieved by using shielded conductive AFM tips (See B. T. Rosner, T. Bork, Vivek Agrawal and D. W. van der Weide: *Sens. & Actuat.* A 102 (2002) 185.) and thus the inventors predict that more resistive samples will be accessible with this technique.

According to a third technique provided herein, higher order harmonic functions are employed. For example, second harmonic piezoresponse force microscopy nonlinear dielectric behavior, specifically piezoelectricity and ferroelectricity, is based on electromechanical coupling that is manifest in first order and second order response functions. This occurs in a wide range of compounds including oxide ferroelectrics such as $BaTiO_3$, and polymers such as polyvinylidene fluoride (PVDF) and vinylidene fluoride (VDF) and trifluoroethylene (TrFE) copolymers. (See B. A. Strukov and A. P. Levanyuk: Ferroelectric Phenomena in Crystals: *Physical Foundations*, eds. B. A. Strukov and A. P. Levanyuk (Springer-Verlag Heidelberg, 1998), Chap. 5, p. 110.; R. E. Newnham, V. Sundar, R. Yimnirun, J. Su and Q. M. Zhang: *J. Phys. Chem.* B 101 (1997) 10141.) Techniques abound for characterizing macroscopic properties but the primary tool for local measurements is PFM. (See A. Gruverman, O. Kolosov, J. Hatano, K. Takahashi and H. Tokumoto: *J. Vac. Sci. & Technol.* B 13 (1995) 1095.; L. M. Eng, H. J. Gutherodt, G. A. Schneider, U. Kopke and J. Munoz Saldana: *Appl. Phys. Lett.* 74 (1999) 233; C. Durkan and M. E. Welland: *Ultramicroscopy* 82 (2000) 141.) There has been growing interest in the electrostrictive effect, which could be accessed locally via second harmonic responses to local fields.

When the field and the measured electrostrictive strain are in the z direction, electrostriction is expressed in terms of the field induced polarization P $$x = Q_{33} P^2 \quad (1)$$

For a ferroelectric with spontaneous polarization PS and field induced polarization PE, the strain becomes $$x = Q_{33}(P^S)^2 + 2Q_{33}P^S P^E + Q_{33}(P^E)^2 \quad (2)$$

where the second and third terms are piezoelectric response (because $d_{33} = 2Q_{33}P^S/\epsilon$) and the electrostrictive response, respectively. On application of a small sinusoidal external filed, $E_3(\omega) = E_3 \cos \omega t$, induced polarization can be approximated as $P^E(\omega) = P^E \cos \omega t$ yielding $$x = Q_{33}\left[(P^S)^2 + \frac{(P^E)^2}{2}\right] + 2Q_{33}P^S P^E \cos \omega t + \frac{1}{2}Q_{33}(P^E)^2 \cos 2\omega t \quad (3)$$

Macroscopic measurements of electrostriction is quantified with interferometry (See Q. M. Zhang, W. Y. Pan and L. E. Cross: *J. Appl. Phys.* 63 (1988) 2492; I. L. Guy and Z. Zheng: *Ferroelectr.* 264 (2001) 1691.) using lock-in amplifiers to detect the first and second harmonic response signals. Here, we propose detecting second harmonic of the cantilever oscillation in a contact mode SPM to determine local electrostrictive properties.

HH-PFM Experimental Procedures

Figure 5:
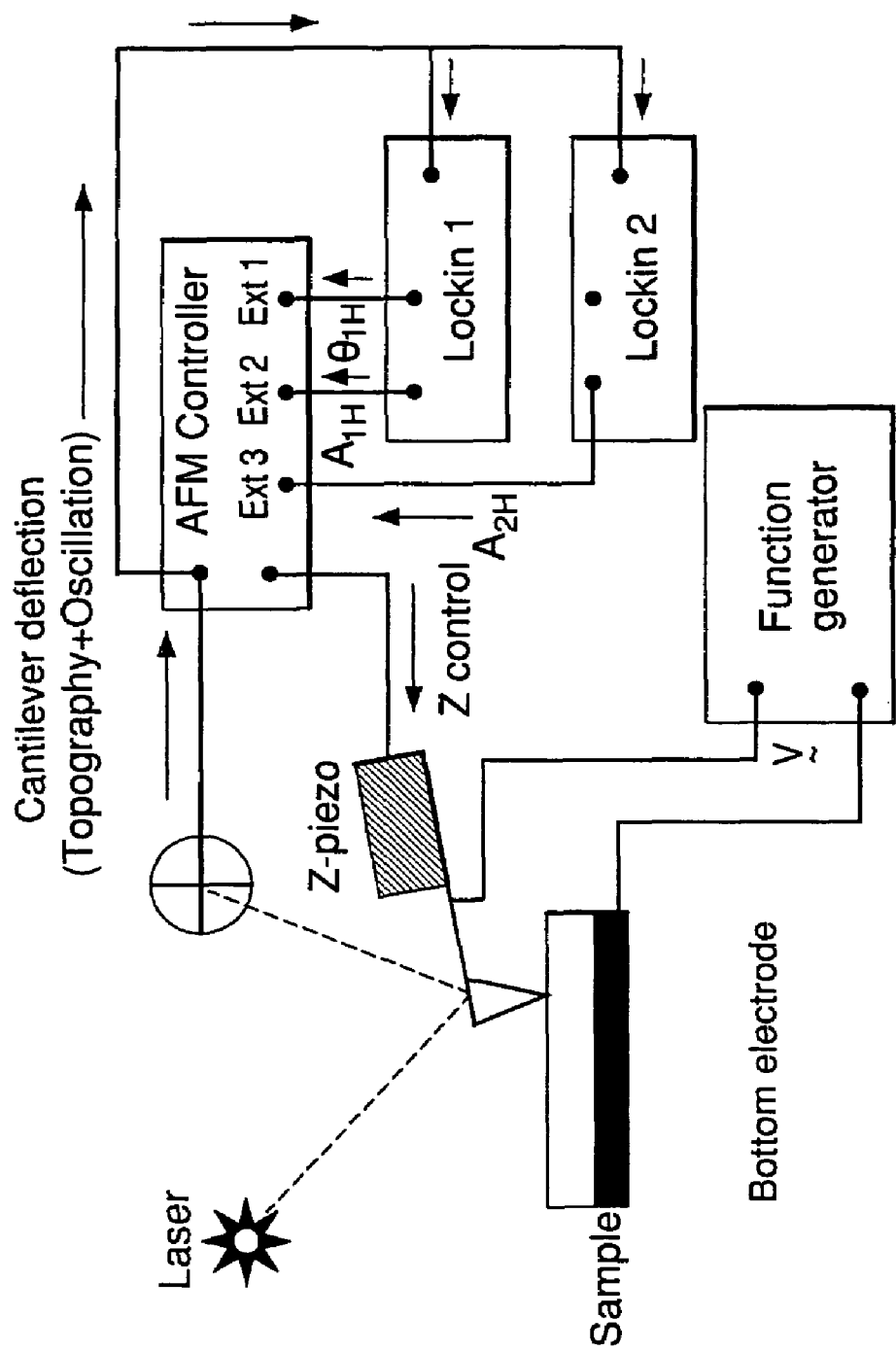
FIG. 5 is an experimental setup of second harmonic piezoresponse force microscopy.

To demonstrate HH-PFM, second harmonic PFM was implemented on a commercial ambient AFM (Digital Instrument Dimension 3100). A superimposed dc and ac bias $V = V_{dc} + V_{ac} \cos \omega t$ was applied to a conducting Cr/Au coated AFM cantilever with spring constant $k \approx 1$N/m. FIG. 5 shows the connections between the tip, function generator, lock-in amplifiers, and AFM control system. Cantilever deflection signal is converted by AFM controller into voltage and input into lock-in amplifiers. First and second harmonic signals from lock-in amplifiers are collected the AFM controller via external channels. The tip is scanned in contact with force feedback, while tip deflection is detected with two lock-in amplifiers. The amplitude and phase of the first harmonic (piezoresponse signals), and the amplitude of the second harmonic signal are simultaneously collected. To acquire the dc bias dependence of first and second harmonic responses, the tip position is fixed and the voltage slowly ramped between −6V and +6V with a triangular waveform and a period of 2 s. A 5Vp-p ac voltage of 50 kHz was simultaneously applied to the tip.

HH-PFM is demonstrated on a spun-cast P(VDF-TrFE) thin film (~100 nm in thickness) on a silicon (100) substrate.

HH-PFM Results and Discussion

Figure 6A:
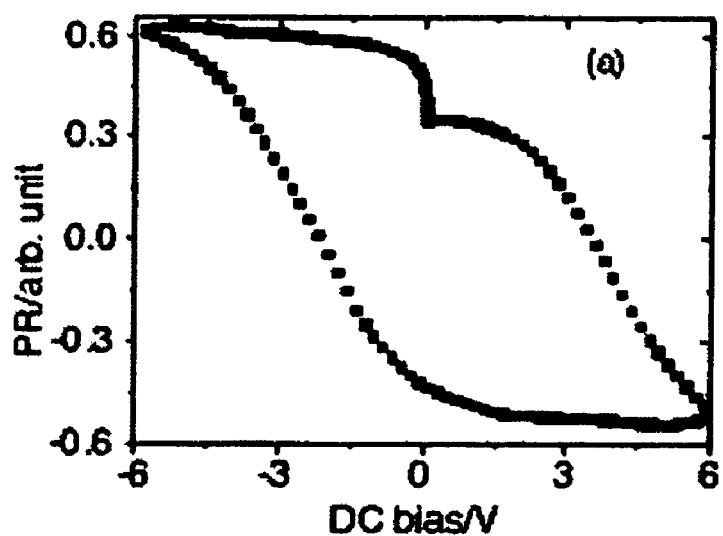
FIG. 6(a) is an electromechanical hysteresis loop on the P(VDF-TrFe) polymer thin film constructed by first harmonic signals (PFM).

Due to the simultaneous dc bias $V_{dc}$ in this measurement, will now denote the $V_{dc}$ induced polarization by $V_{dc}$. With the tip staying at one point, the $V_{dc}$ dependence of piezoresponse signals can be used to construct the electromechanical hysteresis loop, shown in FIG. 6(*a*), according to PR+A cos δ, where A and δ are first harmonic amplitude and phase respectively. This hysteresis loop is the reverse of the usual D-E hysteresis loop. This is because the coefficient of the piezoelectricity response $g_{33} = 2Q_{33}PS$ corresponding to the first harmonic term in eq. (5) is negative since $Q_{33} < 0$ in this material. (See T. Furukawa and N. Seo: *Jpn. J. Appl.*

*Phys.* 29 (1990) 675.) Consequently, PFM phase image of upward domain created by poling with −10V shows 0 degrees phase shift and the negative domain shows 180 degree phase shift, in contrast to oxide ferroelectrics such as PZT and BaTiO3.

Figure 6B:
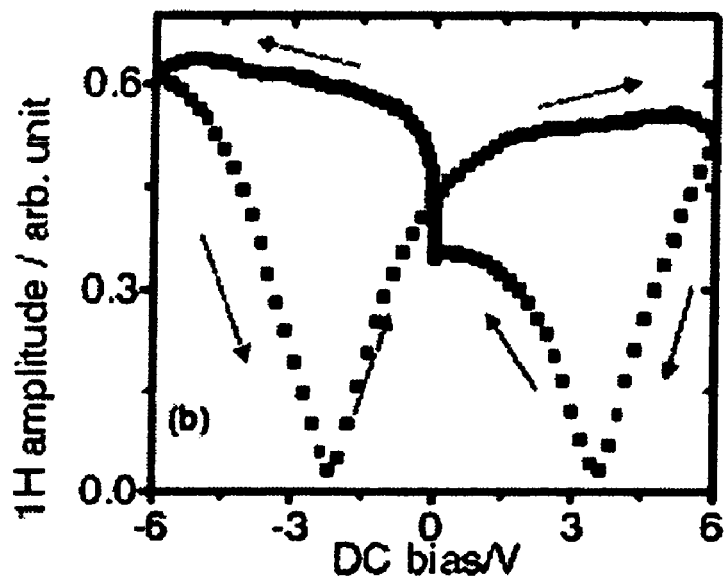
FIG. 6(b) is a first harmonic amplitude hysteresis loops showing opposite trend versus the external field, with arrows indicate the direction of change in $V_{dc}$.
Figure 6C:
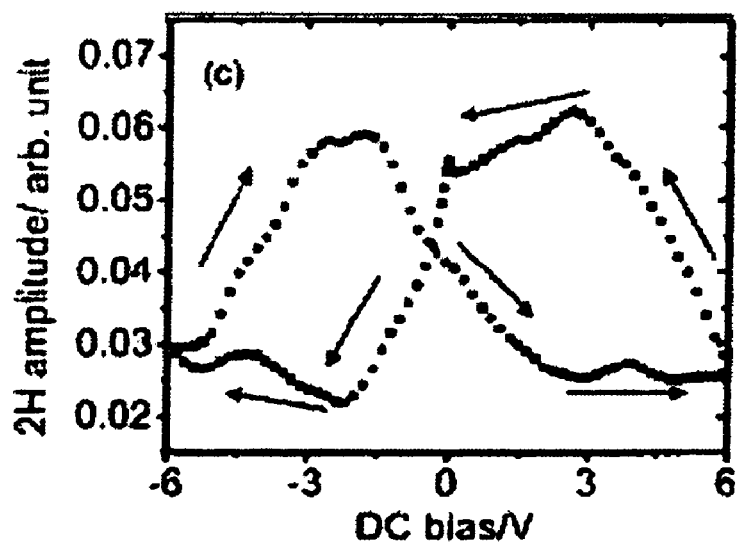
FIG. 6(c) is a second harmonic amplitude hysteresis loops showing opposite trend versus the external field, with arrows indicate the direction of change in $V_{dc}$.

For comparison, amplitudes of first and the second harmonic response, denoted as $A_{1H}$ and $A_{2H}$, versus $V_{dc}$ are shown in FIG. 6(b) and FIG. 6(c). $A_{2H}$ versus $V_{dc}$ is also hysteretic. More interestingly, during the ramping of $V_{dc}$, first and second harmonic amplitudes follow opposite trends, i.e. when the former reaches maximum, the latter reaches minimum, and vice versa. This is detailed as the following.

We can establish a simple quantitative description of the first and second harmonics in the limit that $V_{ac}$ is small. In this case, $V_{ac}$ can be seen as a small perturbation to $V_{dc}$, i.e. $V_{ac} = d(V_{dc})$ and thus the $V_{ac}$ induced $P^E$ is $$P^E = \frac{dP^S}{d(V_{dc})} d(V_{dc}) \quad (4)$$

Rewriting $d(V_{dc})$ as $dV$ and substituting eq. (4) into eq. (3), we have the first and second harmonic amplitudes as $$A_{1H} = 2|Q_{33}|P^S(dP^S/dV)dV; \quad (5)$$

and $$A_{2H} = |Q_{33}|((dP^S/dV)dV)^2; \quad (6)$$

From eq. (6) we know that the hysteresis in $A_{2H}$ versus $V_{dc}$ is in effect the dependence of the derivative dielectric constant $\epsilon$ on field, since $$\frac{dP^S}{dV} = \frac{dP^S}{LdE} = \frac{\varepsilon}{L},$$

where L is the thickness of the film. When $V_{dc}$ is high, $P^S$ becomes large but the corresponding $\epsilon$ becomes small.

In principle, these relationships describe the contrast in the first and second harmonic amplitude images. However, rigorous treatment must account for the finite magnitude of $V_{ac}$.

Figure 7A:
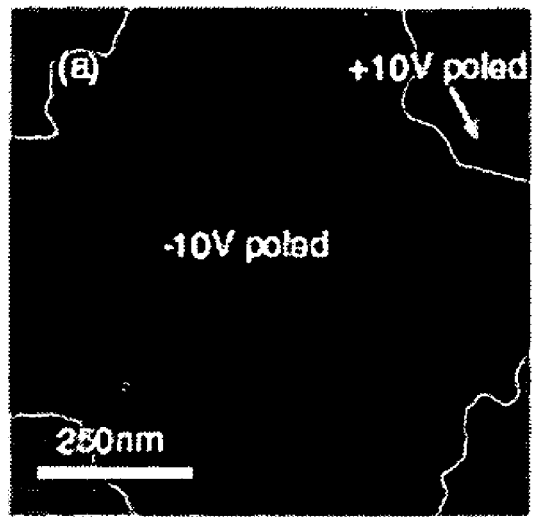
FIG. 7(a) is a harmonic phase image poled P(VDF-TrFe) polymer thin film.
Figure 7B:
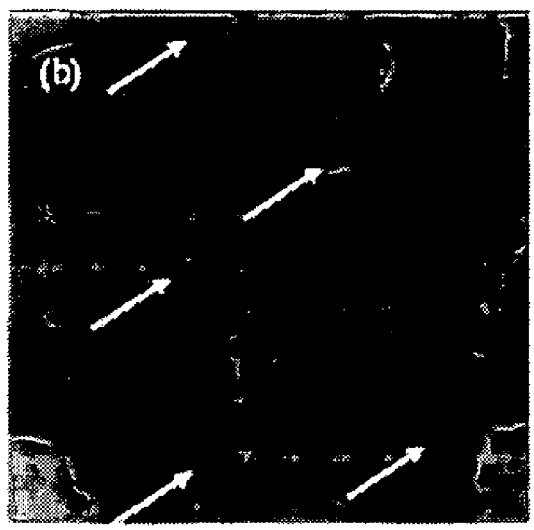
FIG. 7(b) is an amplitude image of the first harmonic of the image of FIG. 7(a)
Figure 7C:
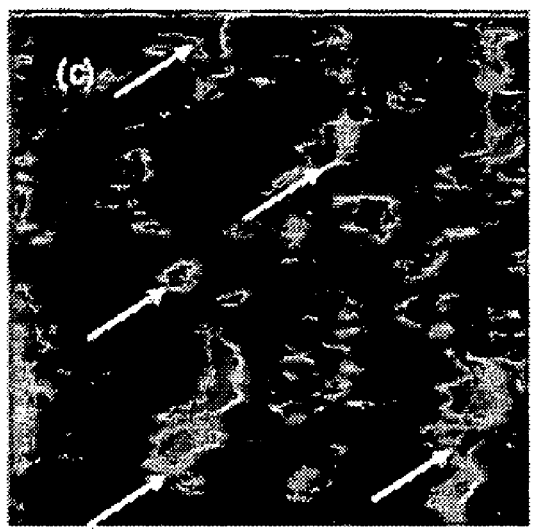
FIG. 7(c) is an amplitude image of the second harmonic of the image of FIG. (a)

FIG. 7(a) shows a first harmonic phase image poled P(VDF-TrFe) polymer thin film with the upward domain poled with −10V showing lower phase shift while negative domains poled with +10V showing higher phase shift, in contrary to PZT. This indicates $g_{33}<0$ and thus $Q_{33}<0$ for this material. FIG. 7(b) is an amplitude image of first harmonic and FIG. 7(c) is an amplitude of the second harmonic of the same area as that of FIG. 7(a). Some maxima in image (b) are minima in image (c) and vice versa.

By comparing the contrast in the first and the second harmonic amplitude images, as shown in FIG. 7(b) and FIG. 7(c), on the poled sample, several regions showing bright contrast in FIG. 7(b) have dark contrast in FIG. 7(c) and vice versa. This phenomenon is the direct illustration of eqs. (5) and (6).

Furthermore, from eqs. (5) and (6), we have $$(P^S)^2 = \frac{A_{1H}^2}{4Q_{33}A_{2H}} \quad (7)$$

Thus the dielectric hysteresis loop $P^S$ vs. $V_{dc}$ can be constructed if $Q_{33}$ for this material is known. Conversely, $Q_{33}$ is deduced from the local D-E hysteresis loop, which can be achieved by microcontact C-V measurement.

Accordingly, NIM is shown to be capable of accessing GB transport at local level and characterizing the tip/sample junction. Furthermore, this approach is general and holds the promise of probing frequency dependent transport in isolated nanostructures. Designed for the measurement of electrostriction in ferroelectric materials, HH-PFM yields quantitative information about local nonlinear dielectric properties and higher order electromechanical couplings of ferroelectrics.

This work demonstrates that by electrical modulation of the tip/sample interaction and detecting the frequency response and the higher order harmonics, nonlinear properties of complex materials can be quantitatively access at high spatial resolution. One can expect, in the future, the combination of true atomic resolution of ultrahigh vacuum (UHV) AFM and the multiple modulation probes will significantly enhance our understanding of nanoscale processes in complex systems.

We claim:

1. A method of assessing properties of a sample's grain boundaries, comprising the steps of:
    (a) providing a scanning force microscope probe having a conductive probe tip on a cantilever,
    (b) disposing the tip on a point on a surface of the sample,
    (c) applying a modulated voltage to the probe tip; and
    (d) providing an electrode in contact with the sample to enable acquiring of impedance modulus and phase, whereby information relating to grain boundaries may be obtained.

2. The method of claim 1 wherein the information includes electrical information about the transport properties across the grain boundaries.

3. The method of claim 2 wherein the probe tip is electrically isolated from the scanning force microscope's feedback mechanism, thereby enabling the measurement of mechanical surface properties at the point on the surface.

4. The method of claim 3 wherein the scanning force microscope is an atomic force microscope and the mechanical surface properties include topography.

5. The method of claim 3 further comprising the step of moving the probe tip to another point on the surface for measuring impedance spectra.

6. The method of claim 5 further comprising the step of measuring mechanical surface properties.

7. The method of claim 6 wherein the probe tip contacts the surface and the mechanical surface property measured corresponds to cantilever deflection.

8. The method of claim 3 wherein the electrode contacts the surface proximate the probe tip.

9. The method of claim 3 wherein the electrode contacts the sample opposite the probe tip.

* * * * *